United States Patent [19]
Takahashi et al.

[11] Patent Number: 5,635,547
[45] Date of Patent: Jun. 3, 1997

[54] PROCESS FOR PREPARING SILICONE RUBBER COMPOSITION

[75] Inventors: Masaharu Takahashi; Minoru Igarashi, both of Matsuida-machi, Japan

[73] Assignee: Shin-Etsu Chemical Co., Ltd., Tokyo, Japan

[21] Appl. No.: 417,015

[22] Filed: Apr. 5, 1995

[30] Foreign Application Priority Data

Apr. 5, 1994 [JP] Japan .................. 6-090687

[51] Int. Cl.$^6$ .............. C08K 9/06; B05D 7/00; C08L 83/04
[52] U.S. Cl. .......... 523/213; 523/212; 524/588; 524/860; 524/863; 524/864; 427/215; 427/219
[58] Field of Search .................. 523/212, 213; 524/588, 863, 864, 860; 427/215, 219

[56] References Cited

U.S. PATENT DOCUMENTS

| | | | |
|---|---|---|---|
| 4,477,625 | 10/1984 | Lockhart | 524/789 |
| 4,849,022 | 7/1989 | Kobayashi et al. | 106/490 |
| 5,236,997 | 8/1993 | Fujiki | 524/731 |

FOREIGN PATENT DOCUMENTS 0 432 761A2  6/1991  European Pat. Off. .

OTHER PUBLICATIONS

Chemical Abstract No. 32354, vol. 84, No. 6, Feb. 9, 1976.

*Primary Examiner*—Karen A. Dean
*Attorney, Agent, or Firm*—Cushman Darby & Cushman IP Group Pillsbury Madison & Sutro LLP

[57] ABSTRACT

The process comprises the steps of (A) mixing a base material (A-1), which is obtained by mixing an organopolysiloxane and a reinforcing silica and then heating the resulting mixture, with an aminosilane compound (A-2) represented by the formula:

$$(R^1)_n Si[N(R^2)_2]_{(4-n)}$$

wherein a plurality of $R^1$ may be the same or different and are each a substituted or unsubstituted monovalent hydrocarbon group, a plurality of $R^2$ may be the same or different and are each a substituted or unsubstituted monovalent hydrocarbon group, and n is 2 or 3; to allow them to react; and (B) heating the reaction mixture obtained in the step (A) under normal pressure or reduced pressure to remove an unreacted aminosilane compound and a by-product amine, contained in the reaction mixture. According to this process, a silicone rubber composition that can produce a silicone rubber cured product improved in compression set properties can be obtained without damaging other good properties inherent in silicone rubber.

8 Claims, No Drawings

PROCESS FOR PREPARING SILICONE RUBBER COMPOSITION

BACKGROUND OF THE INVENTION

1. Field of the Invention

This invention relates to a process for preparing a silicone rubber composition that can produce a silicone rubber showing superior compression set properties.

2. Description of the Prior Art

Silicone rubber is widely used in the field of electronic equipment, automobiles, construction, medical treatment and so forth because of its good weatherability, electrical properties, freeze resistance, and compression set properties (resistance). In particular, silicone rubber is used in O-rings, gaskets, sealing mediums and roll materials because of its good compression set properties retainable at a wide temperature range and over a long period of time.

In recent years, a variety of methods for further improving the compression set properties of silicone rubber have been studied. For example, methods are known in which metal oxides such as cerium oxide are mixed, or unsaturated groups contributing to cross-linking are introduced to the side chains or terminals of organopolysiloxanes. Such methods, however, only enable decrease of compression set to a certain extent and have the a disadvantage that other physical properties deteriorate.

Japanese Unexamined Patent Publication (Kokai) No. 3-277658 discloses a method in which a silicone elastomer base material containing a silanol group, having been heated, is mixed with a disilazane containing an alkenyl group (an aliphatic unsaturated hydrocarbon group), followed by heating. This method can achieve a lower compression set, but has a difficulty of making other physical properties poor, e.g., causing an increase in hardness and a decrease in elongation and tear strength.

SUMMARY OF THE INVENTION

Accordingly, an object of the present invention is to provide a process for preparing a silicone rubber composition from which silicone rubber improved in compression set properties can be obtained without damaging other good properties inherent in silicone rubber.

To achieve the above object, the present invention provides a process for preparing a silicone rubber composition, comprising the steps of:

(A) mixing:

a silicone base material (A-1), which is obtained by mixing an organopolysiloxane and a reinforcing silica and then heating the resulting mixture, with at least one component (A-2) selected from the group consisting of an aminosilane compound represented by the following general formula (1):

(R¹)₃Si[N(R²)₂]  (1)

wherein a plurality of $R^1$ may be the same or different and each represent a substituted or unsubstituted monovalent hydrocarbon group, and a plurality of $R^2$ may be the same or different and each represent a substituted or unsubstituted monovalent hydrocarbon group;

and an aminosilane compound represented by the following general formula (2):

(R¹)₂Si[N(R²)₂]₂  (2)

wherein a plurality of $R^1$ may be the same or different and are as defined above, and a plurality of $R^2$ may be the same or different and are as defined above; to allow them to react; and (B) heating the reaction mixture obtained in the step (A), under normal pressure or reduced pressure to remove an unreacted aminosilane compound and a by-product amine, contained in the reaction mixture.

According to the present invention, a silicone rubber composition which can produce a silicone rubber cured product improved in compression set properties can be obtained without damaging other good properties inherent in silicone rubber.

DETAILED DESCRIPTION OF THE INVENTION

Step (A)

(A-1) Silicone Base Material

The silicone base material (A-1) is prepared by mixing an organopolysiloxane and a reinforcing silica, followed by heating.

Organopolysiloxane

The organopolysiloxane is represented by the following average compositional formula (3):

$$R_n SiO_{(4-n)/2} \quad (3)$$

wherein R represents a substituted or unsubstituted monovalent hydrocarbon group, and n is a numeral of 1.95 to 2.05, and a plurality of R contained in the organopolysiloxane may be the same or different.

R in the above average compositional formula (3) represents a substituted or unsubstituted monovalent hydrocarbon group, which is usually a monovalent hydrocarbon group having 1 to 10 carbon atoms, and preferably 1 to 8 carbon atoms. Stated specifically, it can be exemplified by an alkyl group such as a methyl group, an ethyl group, a propyl group or a butyl group; an alkenyl group (an aliphatic unsaturated group) such as a vinyl group or an allyl group; an aryl group such as a phenyl group or a tolyl group; a cycloalkyl group such as a cyclohexyl group; an aralkyl group such as a benzyl group or a β-phenylethyl group; and a radical derived from any of these groups by replacing at least some of the hydrogen atoms bonded to carbon atoms there of with a halogen atom(s) or a cyano group(s), such as a γ-trifluoropropyl group, a chloromethyl group or a cyanoethyl group. The monovalent hydrocarbon groups bonded to the silicon atoms of the organopolysiloxane may preferably comprise 0.001 to 10 mol % of alkenyl groups, and more preferably comprise 0.01 to 5 mol % of alkenyl groups.

The organopolysiloxane may also have a hydroxyl group at a terminal of the molecular chain, in addition to the substituted or unsubstituted monovalent hydrocarbon group. Preferred terminal groups are a dimethylvinylsiloxy group, a trimethylsiloxy group, a trivinylsiloxy group and a dimethylhydroxysiloxy group.

In organopolysiloxanes, preferred are those wherein the monovalent hydrocarbon groups R comprise at least 50 mol % of methyl groups. Other groups which may be included with methyl groups are preferably phenyl group(s) or γ-trifluoropropyl group(s).

The organopolysiloxane to be used may basically be straight-chain polymer but may have a branched structure in part.

The organopolysiloxane may also be a liquid product with a low degree of polymerization. From the viewpoint of practically useful hardness to be imparted to silicone rubber elastomers obtained by curing, it may preferably have an average degree of polymerization of not less than 500, and more preferably ranging from 3,000 to 10,000.

Examples of the organopolysiloxane as described above are shown below.

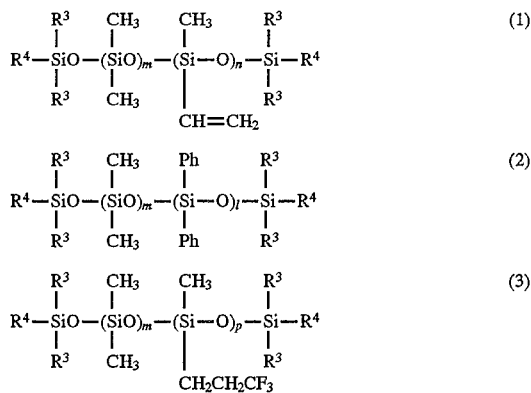

In the formulas (1) to (3), $R^3$ represents —$CH_3$ or a —CH=$CH_2$ group; $R^4$ represents —$CH_3$, a —CH=$CH_2$ group or an OH group; Ph represents a phenyl group; m is an integer of 0 or more; n is an integer of 0 or more; l is an integer of 1 or more; and p is an integer of 1 or more. Preferably, m and n are values giving an average degree of polymerization of not less than 500, and particularly ranging from 3,000 to 10,000, and the ratio m/n is a ratio giving an alkenyl quantity of from 0.001 to 10 mol %, and particularly from 0.01 to 5 mol %. The integers represented by m and l satisfy the relationship of 0<l /(m+l)<0.2, and m and p satisfy the relationship of 0<p/(m+p)≦1.

Reinforcing Silica

The reinforcing silica is a component necessary for increasing the mechanical strength of silicone rubber.

The reinforcing silica to be used may preferably have a specific surface area of 20 $m^2/g$ or above, and more preferably ranging from 100 to 300 $m^2/g$. Of such reinforcing silica, fumed silica, precipitated silica (wet-process silica) and any of these the surfaces of which have been subjected to hydrophobic treatment with hexamethyldisilazane, alkoxysilane or chlorosilane are preferably used.

The reinforcing silica may be mixed usually in an amount ranging from 5 to 70 parts by weight, and preferably from 20 to 50 parts by weight, based on 100 parts by weight of the organopolysiloxane.

In order to disperse the reinforcing silica in the organopolysiloxane, it is preferable to add a dispersant, e.g. , trimethylsilanol, diphenylsilanediol, hexamethyldisilazane, and polydimethylsiloxane having a hydroxyl group at a terminal of the molecular chain. Such a dispersant may be added in an amount ranging from 0.5 to 30 parts by weight, and preferably from 1 to 20 parts by weight, based on 100 parts by weight of the reinforcing silica.

The silicone base material (A-1) can be prepared by mixing the organopolysiloxane and the reinforcing silica preferably together with the dispersant by a method making use of a hitherto known roll or kneader and thereafter heating the resulting mixture under reduced pressure or normal pressure by a method making use of a hitherto known kneader or dryer. The heating is applied for the purposes of removing volatile components and accelerating the reaction of the reinforcing silica with the organopolysiloxane, and is carried out at a temperature ranging from 100° to 250° C. for 1 to 6 hours. If the heating is not applied, the composition obtained after the mixing with the aminosilane compound may become excessively hard and thus result in very poor workability.

A-2 Aminosilane Compound

The component (A-2) is at least one compound selected from the group consisting of the aminosilane compound represented by the general formula (1) and the aminosilane compound represented by the general formula (2) as previously shown.

The $R^1$ is a substituted or unsubstituted monovalent hydrocarbon group, preferably having 1 to 10 carbon atoms. Stated specifically, it can be exemplified by an alkyl group such as a methyl group, an ethyl group, a butyl group or a propyl group; an aryl group such as a phenyl group or a tolyl group; and a radical derived from any of these groups by replacing at least some of the hydrogen atoms bonded to carbon atoms there of with a halogen atom(s) or a cyano group(s), such as a fluoropmethyl group or trifluoropropyl group.

It is also possible to use an aminosilane compound containing as the $R^1$ substituent, an alkenyl group such as a vinyl group, an allyl group or a butenyl group. When, however, the aminosilane compound containing an alkenyl group is used, the hardness of the silicone rubber obtained by curing may become higher than the case when no such aminosilane compound is used, resulting in a decrease in elongation. Hence, the alkenyl group-containing aminosilane compound can be effectively used when the improvement in compression set properties is important and the properties such as hardness and elongation may be changed.

The $R^2$ is a substituted or unsubstituted monovalent hydrocarbon group, preferably having 1 to 10 carbon atoms. Stated specifically, it may include the groups exemplified as the $R^1$, of which a methyl group and an ethyl group are preferred.

The aminosilane compound represented by the general formula (1) can be exemplified by $Me_3Si(NMe_2)$, $Me_3Si(NEt_2)$, $Me_3Si(NBu_2)$, $Et_3Si(NMe_2)$ and $Me_2PhSi(NMe_2)$, wherein Me represents a methyl group, Et an ethyl group, Bu a butyl group, and Ph a phenyl group. In particular, $Me_3Si(NMe_2)$ and $Me_3Si(NEt_2)$ are preferred.

The aminosilane compound represented by the general formula (2) can be exemplified by $Me_2Si(NMe_2)_2$, $Me_2Si(NEt_2)_2$, $Et_2Si(NMe_2)_2$ and $Me_2Si(NBu_2)_2$, wherein Me, Et and Bu are as shown above.

The component A-2 may preferably be mixed in an amount ranging 0.1 to 20 parts by weight, and more preferably from 0.5 to 5 parts by weight, based on 100 parts by weight of the component (A-1). If the amount of the component (A-2) is too small, the compression set properties can not be well improved, and if too large, can no longer be further improved, only resulting in an economical disadvantage.

The component (A-2) may be used alone or in combination of two or more kinds.

In the step (A), the component (A-1) and component (A-2) are mixed, and allowed to react at a temperature usually ranging from 10° to 200° C., and preferably from 50° to 150° C. The reaction may be carried out for usually 5 minutes or longer, and preferably from 0.5 to 2 hours. This reaction may preferably be carried out in a closed system so that the component (A-2) can be prevented from escaping out of the reaction system. Especially when the reaction is carried out at 70° C. or above, it must be done in a closed system.

Step (B)

The step (B) is the step of heating the reaction mixture obtained in the step (A) under normal pressure or reduced pressure to remove an unreacted component (A-2) and an amine, the by-product of the above reaction, contained in the reaction mixture.

In the step (B), the reaction mixture obtained in the step (A) is heated under normal pressure, preferably under reduced pressure of 1 to 700 mmHg, and more preferably from 1 to 500 mmHg, at a temperature of preferably from 50° to 250° C., and more preferably from 150° to 200° C. The reaction may be carried out usually for 5 minutes or longer, and preferably from 10 minutes to 2 hours.

As a result of the step (B) thus carried out, the compression set properties of the silicone rubber obtained by curing are improved. A silicone rubber obtained by curing the above reaction mixture without the step (B) has in reverse a large compression set, in other words, low compression set properties.

In the production process of the present invention, it is also possible to optionally further add various additives including colorants commonly used, thermal resistance improvers as exemplified by cerium dioxide and iron oxide, flame retardancy improvers as exemplified by platinum and titanium dioxide, conductivity-providing agents as exemplified by carbon and graphite, foaming agents as exemplified by azobisisobutylonitrile and azodicarbonamide, and release agents.

Curing

The silicone rubber composition obtained by the production process of the present invention can be vulcanized and molded in the same manner as in hitherto known silicone rubber compositions.

For example, the composition can be vulcanized and molded by adding as a vulcanizing agent an organic peroxide such as benzoyl peroxide, 2,4-dichlorobenzoyl peroxide, dicumyl peroxide, 2,5-dimethyl-di-tert-butyl peroxide, di-tert-butyl peroxide or 2,5-dimethyl-2,5-bis(tert-butylperoxy) hexane, followed by press molding, transfer molding or extrusion. The organic peroxide may preferably be added in an amount of from 0.1 to 5 parts by weight based on 100 parts by weight of the silicone rubber composition.

When the organopolysiloxane used in the preparation of the silicone base material (A-1) has two or more alkenyl groups in its molecule, an organohydrogenpolysiloxane having two or more hydrogen atoms bonded to a silicon atom may be added as a cross-linking agent. Such an organohydrogenpolysiloxane may be added in such an amount that the hydrogen atoms bonded to the silicon atoms of the organohydrogenpolysiloxane come to be in an amount of from 0.5 to 5 mols per mole of alkenyl group of the organopolysiloxane. When the organohydrogenpolysiloxane is added, it is preferable to use a catalyst such as platinum.

After the above vulcanization and molding, the product may be further subjected to secondary vulcanization.

The silicone rubber obtained by curing the silicone rubber composition resulting from the production process of the present invention shows compression set properties superior to those of conventional ones and also has other properties inherent in silicone rubber that are equivalent to those of conventional ones. Cured products thus obtained can be very useful as, e.g., O-rings, gaskets, sealing mediums and roll materials.

EXAMPLES

Example 1

To 100 parts by weight of an organopolysiloxane with an average degree of polymerization of about 8,000 comprised of 99.825 mol % of dimethylsiloxane units, 0.15 mol % of methylvinylsiloxane units and 0.025 mol % of dimethylvinylsiloxane units, 10 parts by weight of a dispersant silanol-terminated straight-chain dimethylpolysiloxane and 40 parts by weight of fumed silica (available from Nippon Aerosil Co., Ltd. ) with a specific surface area of 200 $m^2$/g were added, and the resulting mixture was heated at 170° C. for 2 hours to obtain a silicone base material.

To the silicone base material thus obtained, 1 g of dimethylaminotrimethylsilane was added, followed by stirring at 90° to 100° C. for 30 minutes in a closed system. Next, the resulting reaction mixture was heated under conditions of 450 mmHg and 170° C. to remove the volatile components. Thus a silicone rubber composition was obtained.

To 100 parts by weight of the silicone rubber composition obtained, 1 part by weight of 2,5-dimethyl-2,5-bis (tert-butylperoxy) hexane was added to carry out press vulcanization at 165° C. for 10 minutes (hereinafter this vulcanization is called primary vulcanization). Thus a silicone rubber cured product was obtained.

On the silicone rubber cured product obtained, its hardness, tensile strength, elongation, tear strength and compression set were measured according to JIS K 6301. Results obtained are shown in Table 1.

The silicone rubber cured product having been subjected to the primary vulcanization was further heated at 200° C. for 4 hours to carry out secondary vulcanization. On the cured product obtained after the secondary vulcanization, its hardness, tensile strength, elongation, tear strength and compression set were measured according to JIS K 6301. Results obtained are shown in Table 1.

Example 2

In the present Example, silicone rubber cured products were obtained in the same manner as in Example 1 except that the dimethylaminotrimethylsilane was added in an amount of 2 g. On the cured product obtained after the primary vulcanization and the cured product obtained after the secondary vulcanization, their hardness, tensile strength, elongation, tear strength and compression set were measured in the same manner as in Example 1. Results obtained are shown in Table 1.

Example 3

In the present Example, silicone rubber cured products were obtained in the same manner as in Example 1 except that the dimethylaminotrimethylsilane was added in an amount of 5 g. On the cured product obtained after the primary vulcanization and the cured product obtained after the secondary vulcanization, their hardness, tensile strength, elongation, tear strength and compression set were measured in the same manner as in Example 1. Results obtained are shown in Table 1.

Example 4

In the present Example, silicone rubber cured products were obtained in the same manner as in Example 1 except that the dimethylaminotrimethylsilane was replaced with 1 g of diethylaminotrimethylsilane. On the cured product obtained after the primary vulcanization and the cured product obtained after the secondary vulcanization, their hardness, tensile strength, elongation, tear strength and compression set were measured in the same manner as in Example 1. Results obtained are shown in Table 1.

Example 5

In the present Example, silicone rubber cured products were obtained in the same manner as in Example 1 except that the dimethylaminotrimethylsilane was replaced with 1 g of diethylaminodimethylvinylsilane. On the cured product obtained after the primary vulcanization and the cured product obtained after the secondary vulcanization, their hardness, tensile strength, elongation, tear strength and compression set were measured in the same manner as in Example 1. Results obtained are shown in Table 1.

Example 6

In the present Example, silicone rubber cured products were obtained in the same manner as in Example 1 except that 1.0 g of cerium oxide as a thermal resistance improver was added at room temperature before the 2,5-dimethyl-2, 5-bis(tert-butylperoxy)hexane was added to the silicone rubber composition. On the cured product obtained after the primary vulcanization and the cured product obtained after the secondary vulcanization, their hardness, tensile strength, elongation, tear strength and compression set were measured in the same manner as in Example 1. Results obtained are shown in Table 1.

Example 7

In the present Example, silicone rubber cured products were obtained in the same manner as in Example 2 except that 1.0 g of cerium oxide as a thermal resistance improver was added at room temperature before the 2,5-dimethyl-2, 5-bis(tert-butylperoxy) hexane was added to the silicone rubber composition. On the cured product obtained after the primary vulcanization and the cured product obtained after the secondary vulcanization, their hardness, tensile strength, elongation, tear strength and compression set were measured in the same manner as in Example 1. Results obtained are shown in Table 1.

Example 8

In the present Example, silicone rubber cured products were obtained in the same manner as in Example 1 except that the dimethylaminotrimethylsilane was replaced with 1 g of bis(dimethylamino)dimethylsilane. On the cured product obtained after the primary vulcanization and the cured product obtained after the secondary vulcanization, their hardness, tensile strength, elongation, tear strength and compression set were measured in the same manner as in Example 1. Results obtained are shown in Table 1.

Example 9

In the present Example, silicone rubber cured products were obtained in the same manner as in Example 1 except that the dimethylaminotrimethylsilane was replaced with 2 g of bis(diethylamino)dimethylsilane. On the cured product obtained after the primary vulcanization and the cured product obtained after the secondary vulcanization, their hardness, tensile strength, elongation, tear strength and compression set were measured in the same manner as in Example 1. Results obtained are shown in Table 1.

Example 10

In the present Example, silicone rubber cured products were obtained in the same manner as in Example 1 except that the fumed silica was replaced with 40 parts by weight of precipitated silica (trade name: NIPSIL; available from Nippon Silica Industrial Co., Ltd.). On the cured product obtained after the primary vulcanization and the cured product obtained after the secondary vulcanization, their hardness, tensile strength, elongation, tear strength and compression set were measured in the same manner as in Example 1. Results obtained are shown in Table 1.

Comparative Example 1

To 100 parts by weight of the same silicone base material as used in Example 1, 1 part by weight of 2,5-dimethyl-2, 5-bis(tert-butylperoxy)hexane was added to carry out primary vulcanization in the same manner as in Example 1. On the silicone rubber cured product obtained after the primary vulcanization, its hardness, tensile strength, elongation, tear strength and compression set were measured in the same manner as in Example 1. Results obtained are shown in Table 2. The silicone rubber cured product obtained after the primary vulcanization was subjected to secondary vulcanization in the same manner as in Example 1. On the cured product obtained after the secondary vulcanization, its hardness, tensile strength, elongation, tear strength and compression set were measured in the same manner as in Example 1. Results obtained are shown in Table 2.

Comparative Example 2

In the present Comparative Example, silicone rubber cured products were obtained in the same manner as in Example 1 except that the dimethylaminotrimethylsilane was replaced with 1 g of 1,3-divinyltetramethyldisilazane. On the silicone rubber cured product obtained after the primary vulcanization and the cured product obtained after the secondary vulcanization, their hardness, tensile strength, elongation, tear strength and compression set were measured in the same manner as in Example 1. Results obtained are shown in Table 2.

Comparative Example 3

In the present Comparative Example, silicone rubber cured products were obtained in the same manner as in Comparative Example 1 except that 1.0 g of cerium oxide as a thermal resistance improver was added at room temperature before the 2,5-dimethyl-2,5-bis(tert-butylperoxy) hexane was added to the silicone base material. On the silicone rubber cured product obtained after the primary vulcanization and the cured product obtained after the secondary vulcanization, their hardness, tensile strength, elongation, tear strength and compression set were measured in the same manner as in Example 1. Results obtained are shown in Table 2.

Comparative Example 4

In the present Comparative Example, silicone rubber cured products were obtained in the same manner as in Example 1 except that the reaction product obtained by adding the dimethylaminotrimethylsilane was not heated under conditions of 450 mmHg and 170° C., i.e., the volatile components were not removed. On the silicone rubber cured product obtained after the primary vulcanization and the cured product obtained after the secondary vulcanization, their hardness, tensile strength, elongation, tear strength and compression set were measured in the same manner as in Example 1. Results obtained are shown in Table 2.

Comparative Example 5

To 100 parts by weight of the same silicone base material as used in Example 10, 1 part by weight of 2,5-dimethyl-2,5-bis(tert-butylperoxy) hexane was added to carry out primary vulcanization in the same manner as in Example 1. On the silicone rubber cured product obtained after the primary vulcanization, its hardness, tensile strength, elongation, tear strength and compression set were measured in the same manner as in Example 1. Results obtained are shown in Table 2. The silicone rubber cured product obtained after the primary vulcanization was subjected to secondary vulcanization in the same manner as in Example 1. On the cured product obtained after the secondary vulcanization, its hardness, tensile strength, elongation, tear strength and compression set were measured in the same manner as in Example 1. Results obtained are shown in Table 2.

TABLE 1

|  | Example |  |  |  |  |
|---|---|---|---|---|---|
|  | 1 | 2 | 3 | 4 | 5 |
| Hardness (JIS A)*1 | | | | | |
| Initial: | 51 | 51 | 50 | 50 | 70 |
| After secondary vulcanization | 54 | 54 | 52 | 55 | 71 |
| Tensile strength (kgf/cm²) | | | | | |
| Initial: | 115 | 111 | 110 | 115 | 87 |
| After secondary vulcanization | 110 | 114 | 109 | 115 | 89 |
| Elongation (%) | | | | | |
| Initial: | 580 | 560 | 580 | 570 | 270 |
| After secondary vulcanization: | 560 | 570 | 560 | 560 | 280 |
| Tear strength (kgf/cm) | | | | | |
| Initial: | 27 | 27 | 25 | 24 | 16 |
| After secondary vulcanization: | 25 | 26 | 25 | 25 | 17 |
| Compression set (%) (180° C./22 hrs) | | | | | |
| Initial: | 12.6 | 9.9 | 7.5 | 13.2 | 9.2 |
| After secondary vulcanization: | 12.1 | 8.9 | 6.0 | 10.4 | 7.5 |

|  | Example |  |  |  |  |
|---|---|---|---|---|---|
|  | 6 | 7 | 8 | 9 | 10 |
| Hardness (JIS A)*1 | | | | | |
| Initial: | 52 | 49 | 52 | 50 | 47 |
| After secondary vulcanization: | 52 | 52 | 55 | 53 | 49 |
| Tensile strength (kgf/cm²) | | | | | |
| Initial: | 113 | 107 | 113 | 110 | 97 |
| After secondary vulcanization: | 114 | 111 | 114 | 115 | 100 |
| Elongation (%) | | | | | |
| Initial: | 560 | 540 | 590 | 560 | 490 |
| After secondary vulcanization: | 560 | 540 | 570 | 560 | 430 |
| Tear strength (kgf/cm) | | | | | |
| Initial: | 24 | 23 | 26 | 24 | 14 |
| After secondary vulcanization: | 27 | 23 | 25 | 25 | 14 |
| Compression set (%) (180° C./22 hrs) | | | | | (*2) |
| Initial: | 12.5 | 10.2 | 14.0 | 10.3 | 13.5 |
| After secondary vulcanization: | 6.9 | 6.2 | 10.5 | 9.5 | 7.2 |

TABLE 1-continued

*1: JIS K 6301 Spring type hardness tester (Type-A)
*2: 150° C./22 hrs

TABLE 2

|  | Comparative Example |  |  |  |
|---|---|---|---|---|
|  | 1 | 2 | 3 | 4 |
| Hardness (JIS A) | | | | |
| Initial: | 50 | 58 | 50 | 43 |
| After secondary vulcanization: | 56 | 62 | 56 | 43 |
| Tensile strength (kgf/cm²) | | | | |
| Initial: | 117 | 116 | 105 | 101 |
| After secondary vulcanization: | 110 | 110 | 114 | 101 |
| Elongation (%) | | | | |
| Initial: | 660 | 480 | 560 | 640 |
| After secondary vulcanization: | 580 | 450 | 560 | 670 |
| Tear strength (kgf/cm) | | | | |
| Initial: | 28 | 21 | 24 | 17 |
| After secondary vulcanization: | 27 | 21 | 27 | 19 |
| Compression set (%) (180° C./22 hrs) | | | | |
| Initial: | 22.7 | 17.5 | 25.5 | 66.0 |
| After secondary vulcanization: | 20.5 | 15.7 | 14.9 | 35.9 |

We claim:

1. A process for preparing a silicone rubber composition, comprising the steps of:

(A) mixing a base material component (A-1), which is obtained by mixing an organopolysiloxane and a reinforcing silica and then heating the resulting mixture at a temperature of 100° to 250° C. for 1 to 6 hours, with at least one component (A-2) selected from the group consisting of an aminosilane compound represented by the following general formula (1):

$$(R^1)_3Si[N(R^2)_2] \qquad (1)$$

wherein a plurality of $R^1$ may be the same or different and each represent a substituted or unsubstituted monovalent hydrocarbon group, and a plurality of $R^2$ may be the same or different and each represent a substituted or unsubstituted monovalent hydrocarbon group;

and an aminosilane compound represented by the following general formula (2):

$$(R^1)_2Si[N(R^2)_2]_2 \qquad (2)$$

wherein a plurality of $R^1$ may be the same or different and are as defined above, and a plurality of $R^2$ may be the same or different and are as defined above; and allowing them to react; and (B) heating the reaction mixture obtained in the step (A) under normal pressure or reduced pressure to remove an unreacted aminosilane compound and a by-product amine, contained in the reaction mixture.

2. The process of claim 1, wherein the reaction of said component (A-1) with said component (A-2) is carried out in a closed system.

3. The process of claim 1, wherein said aminosilane compound represented by the general formula (1) is at least one selected from the group consisting of $Me_3Si$ $(NMe_2)$, $Me_3Si$ $(NEt_2)$, $Me_3Si$ $(NBu_2)$, $Et_3Si$ $(NMe_2)$ and $Me_2PhSi$ $(NMe_2)$, wherein Me represents a methyl group, Et an ethyl group, Bu a butyl group, and Ph a phenyl group; and said aminosilane compound represented by the general formula (2) is at least one selected from the group consisting of $Me_2Si$ $(NMe_2)_2$, $Me_2Si$ $(NEt_2)_2$, $Et_2Si$ $(NMe_2)_2$ and $Me_2Si$ $(NBu_2)_2$, wherein Me, Et and Bu are as shown above.

4. The process of claim 1, wherein said component (A-2) is mixed in an amount of from 0.1 part by weight to 20 parts by weight based on 100 parts by weight of said component (A-1).

5. A cured product of the silicone rubber composition obtained by the process of claim 1.

6. The process of claim 1, wherein the substituted or unsubstituted monovalent hydrocarbon group defined by $R^1$ and $R^2$ in the general formula (1) is an alkyl group, an aryl group, or a radical derived from one of said groups by substituting at least part of the hydrogens bonded to carbon atoms contained in said groups with a halogen atom or a cyano group.

7. A process according to claim 1 wherein base material (A-1) is allowed to react with the aminosilane (A-2) at 10° to 200° C. for 0.5 to 2 hours and step (B) is carried out at 50° to 250° C. for 5 minutes to 2 hours.

8. A process for improving the compression set properties of a silicone rubber, which comprises the steps of:
    preparing a silicone rubber composition in accordance with the process of claim 1, and
    curing the silicone rubber composition to produce said silicone rubber of improved compression set properties.

* * * * *